US012072695B2

(12) United States Patent
Dillon et al.

(10) Patent No.: US 12,072,695 B2
(45) Date of Patent: Aug. 27, 2024

(54) ENHANCED WORK ORDER GENERATION AND TRACKING SYSTEM

(71) Applicant: FISHER-ROSEMOUNT SYSTEMS, INC., Round Rock, TX (US)

(72) Inventors: Steven R. Dillon, Woodbury, MN (US); Gregory H. Rome, Maplewood, MN (US); Scott N. Hokeness, Lakeville, MN (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 27 days.

(21) Appl. No.: 16/896,624

(22) Filed: Jun. 9, 2020

(65) Prior Publication Data

US 2020/0401124 A1   Dec. 24, 2020

Related U.S. Application Data

(60) Provisional application No. 62/864,913, filed on Jun. 21, 2019.

(51) Int. Cl.
*G05B 23/02* (2006.01)
*G06Q 10/20* (2023.01)

(52) U.S. Cl.
CPC ......... *G05B 23/0283* (2013.01); *G06Q 10/20* (2013.01)

(58) Field of Classification Search
CPC ............ G05B 23/0283; G05B 19/4183; G05B 19/4184; G05B 19/41865;
(Continued)

(56) References Cited

U.S. PATENT DOCUMENTS 5,960,214 A    9/1999  Sharpe, Jr. et al.
6,298,454 B1 * 10/2001  Schleiss ............. G05B 23/0227
                                                        714/37
(Continued)

FOREIGN PATENT DOCUMENTS

CN    101964081 A    2/2011
CN    103823458 A    5/2014
(Continued)

OTHER PUBLICATIONS

Chen et al. "BIM-based framework for automatic scheduling of facility maintenance work orders." Automation in Construction 91 (2018): 15-30. (Year: 2018).*

(Continued)

*Primary Examiner* — John S. Wasaff
(74) *Attorney, Agent, or Firm* — MARSHALL, GERSTEIN & BORUN LLP

(57) ABSTRACT

A work order initiation and tracking system is coupled between various plant asset diagnostic systems and a work or business management system within a process plant. The work order initiation and tracking system includes a user interface that enables a user to review diagnostic data, recommendations, and other information from one or more of the diagnostic systems regarding potential or recommended changes to plant assets, and to initiate the generation of one or more work orders to implement the recommendations or corrections based on information from the diagnostic systems. The work order initiation and tracking system assists the user in generating work orders by tracking and viewing the created work orders associated with various assets in the plant based on previous diagnostic information or recommendations, by enabling the user to copy data or information from the asset diagnostic applications into the work order generation system, by translating or associating asset name and tag data from the diagnostic systems to the (Continued)

work order generation system to assure that the correct assets are identified in the work orders, and by tracking the progress of the work orders sent to and generated by the business and work management system to provide the user with information pertaining to previously ordered work within the plant.

49 Claims, 3 Drawing Sheets

(58) Field of Classification Search
CPC ........... G05B 2219/31467; G05B 2219/31469; G05B 2219/32252; G05B 23/0205; G06Q 10/20; Y02P 90/02; Y02P 90/80
USPC .......................................................... 705/305
See application file for complete search history.

(56) References Cited

U.S. PATENT DOCUMENTS

| | | | |
|---|---|---|---|
| 6,965,806 B2 | 11/2005 | Eryurek et al. | |
| 7,051,044 B1* | 5/2006 | Fera | G05B 23/0283 |
| 9,672,521 B1* | 6/2017 | Stevens | G06F 3/00 |
| 10,410,145 B2 | 9/2019 | Dillon et al. | |
| 2002/0123864 A1 | 9/2002 | Eryurek et al. | |
| 2002/0169514 A1* | 11/2002 | Eryurek | G06Q 30/0633 |
| | | | 700/110 |
| 2003/0014500 A1* | 1/2003 | Schleiss | G06Q 10/06 |
| | | | 709/218 |
| 2003/0187865 A1* | 10/2003 | Frisina | G05B 19/41865 |
| | | | 707/999.102 |
| 2004/0158474 A1 | 8/2004 | Karschnia et al. | |
| 2005/0007249 A1* | 1/2005 | Eryurek | G05B 23/027 |
| | | | 340/511 |
| 2005/0033466 A1 | 2/2005 | Eryurek et al. | |
| 2006/0160396 A1* | 7/2006 | Macauley | H04Q 1/136 |
| | | | 439/344 |
| 2006/0229848 A1* | 10/2006 | Armstrong | G05B 23/0286 |
| | | | 702/184 |
| 2007/0067725 A1* | 3/2007 | Cahill | G05B 23/027 |
| | | | 715/733 |
| 2008/0154651 A1* | 6/2008 | Kenefick | G06Q 40/08 |
| | | | 705/4 |
| 2008/0189441 A1* | 8/2008 | Jundt | G05B 19/042 |
| | | | 714/48 |
| 2008/0288321 A1* | 11/2008 | Dillon | G05B 23/0283 |
| | | | 705/7.13 |
| 2009/0077055 A1* | 3/2009 | Dillon | G05B 23/0272 |
| | | | 707/999.005 |
| 2011/0178611 A1* | 7/2011 | Daraiseh | G05B 19/0428 |
| | | | 700/79 |
| 2011/0298629 A1 | 12/2011 | Wilson | |
| 2012/0010917 A1* | 1/2012 | De Godoi | G06Q 10/06 |
| | | | 705/7.12 |
| 2012/0084096 A1* | 4/2012 | Wang | G16H 15/00 |
| | | | 705/2 |
| 2014/0351642 A1* | 11/2014 | Bates | G06F 11/2257 |
| | | | 714/26 |
| 2016/0043866 A1* | 2/2016 | Nixon | H04L 9/0872 |
| | | | 713/168 |
| 2016/0070258 A1* | 3/2016 | Raviola | G06Q 10/06 |
| | | | 700/100 |
| 2016/0187872 A1* | 6/2016 | Bates | G05B 13/02 |
| | | | 700/9 |
| 2016/0363928 A1* | 12/2016 | Seo | G05B 23/0251 |
| 2017/0364870 A1* | 12/2017 | Merg | G06Q 10/20 |
| 2018/0039956 A1* | 2/2018 | McElhinney | G06Q 10/04 |
| 2018/0074483 A1* | 3/2018 | Cruz | G05B 23/0283 |
| 2018/0089637 A1* | 3/2018 | Subramaniyan | G06Q 10/20 |
| 2018/0109955 A1* | 4/2018 | Nixon | H04L 43/045 |
| 2018/0285831 A1* | 10/2018 | Meruva | G06Q 10/1097 |
| 2018/0307221 A1* | 10/2018 | Cline | G06Q 10/20 |
| 2019/0025776 A1 | 1/2019 | Bhattacharya et al. | |
| 2019/0025809 A1* | 1/2019 | Bhattacharya | G05B 23/0275 |
| 2019/0279130 A1* | 9/2019 | Blank | G06Q 10/06311 |

FOREIGN PATENT DOCUMENTS

| | | | |
|---|---|---|---|
| JP | 2004-526243 A | 8/2004 | |
| JP | 2005-531826 A | 10/2005 | |
| WO | WO-0131494 A2 * | 5/2001 | ............. G06Q 10/06 |

OTHER PUBLICATIONS

Cheng, J. C., Chen, W., Chen, K., & Wang, Q. (2020). Data-driven predictive maintenance planning framework for MEP components based on BIM and IoT using machine learning algorithms. Automation in Construction, 112, 103087. (Year: 2020).*

Khan, F. I., & Haddara, M. (2004). Risk-based maintenance (RBM): A new approach for process plant inspection and maintenance. Process safety progress, 23(4), 252-265. (Year: 2004).*

Lahti, J. P., Shamsuzzoha, A., & Kankaanpää, T. (Nov. 2011). Web-based technologies in power plant automation and SCADA systems: A review and evaluation. In 2011 IEEE International Conference on Control System, Computing and Engineering (pp. 279-284). IEEE. (Year: 2011).*

Search Report for Application No. GB2009018.9, dated Dec. 9, 2020.

Examination Report for Application No. GB2009018.9, dated Feb. 22, 2023.

Office Action for Chinese Patent Application No. 202010564656.1, dated Sep. 13, 2023.

Office Action for Japanese Application No. 2020-103550, dated Mar. 26, 2024.

* cited by examiner

ENHANCED WORK ORDER GENERATION AND TRACKING SYSTEM

RELATED APPLICATIONS

This application claims the benefit of U.S. Provisional Application No. 62/864,913 filed on Jun. 21, 2019, and entitled "Enhanced Work Order Generation and Tracking System," the entirety of each of which is hereby expressly incorporated herein by reference.

TECHNICAL FIELD

The present invention relates generally to process plants and, more particularly, to a distributed maintenance and service system that provides enhanced maintenance planning and scheduling features in a process plant.

DESCRIPTION OF THE RELATED ART

Process plants, like those used in chemical, petroleum, or other processes, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure, and flow rate sensors), perform functions within the process such as opening or closing valves and measuring process parameters. The process controller receives signals indicative of process measurements or process variables made by or associated with the field devices and/or other information pertaining to the field devices via the communication buses, uses this information to implement a control routine, and then generates control signals which are sent over one or more of the buses to the field devices to control the operation of the process. Information from the field devices and the controller is typically made available to one or more applications executed by an operator workstation to enable an operator to perform desired functions with respect to the process, such as viewing the current state of the process, modifying the operation of the process, etc.

In the past, conventional field devices were used to send and receive analog (e.g., 4 to 20 milliamp) signals to and from the process controller via an analog bus or analog lines. These 4 to 20 mA signals were limited in nature in that they were indicative of measurements made by the device or of control signals generated by the controller required to control the operation of the device. However, more recently, smart field devices that perform one or more process control functions have become prevalent in the process control industry. In addition to performing a primary function within the process, each smart field device includes a memory and a microprocessor having the capability to store data pertaining to the device, communicate with the controller and/or other devices in a digital or combined digital and analog format, and perform secondary tasks such as self-calibration, identification, diagnostics, etc. A number of standard, open, digital or combined digital and analog communication protocols such as the HART®, PROFI-BUS®, FOUNDATION™ Fieldbus, WORLDFIP®, Device-Net®, and CAN protocols have been developed to enable smart field devices made by different manufacturers to be interconnected within a process control network to communicate with one another, and to perform one or more process control functions.

The all-digital, two-wire bus protocol promulgated by the Fieldbus Foundation, known as the FOUNDATION™ Fieldbus (hereinafter "Fieldbus") protocol uses function blocks located in distributed controllers or different field devices to perform control operations typically performed within a centralized controller. In particular, each Fieldbus field device is capable of including and executing one or more function blocks, each of which receives inputs from and/or provides outputs to other function blocks (either within the same device or within different devices). Each function block may also perform some process control operation such as measuring or detecting a process parameter, controlling a device, or performing a control operation such as implementing a proportional-integral-derivative (PID) control routine. The different function blocks within a process plant are configured to communicate with each other (e.g., over a bus) to form one or more process control loops, the individual operations of which are spread throughout the process and are, thus, decentralized.

With the advent of smart field devices, it is more important than ever to be able to quickly diagnose and correct problems that occur within a process plant. The failure to detect and correct poorly performing loops and devices leads to sub-optimal performance of the process, which can be costly in terms of both the quality and quantity of the product being produced. Typically, applications, i.e., routines used to perform functions within a process plant using information provided by the system, may be installed in and executed by a host or operator workstation. These applications may be related to process functions such as setting and changing set points within the process, and/or may be related to business functions or maintenance functions. For example, an operator may initiate and execute business applications associated with ordering raw materials, replacement parts or devices for the plant, as well as business applications related to forecasting sales and production needs, etc.

In addition, many process plants, especially those that use smart field devices, include maintenance applications that help to monitor and maintain many of the devices within the plant. For example, the Asset Management Solutions (AMS) application sold by Emerson Process Management, Performance Technologies enables communication with and stores data pertaining to field devices to ascertain and track the operating state of the field devices. This activity is typically called condition monitoring. An example of such a system is disclosed in U.S. Pat. No. 5,960,214 entitled "Integrated Communication Network for use in a Field Device Management System." In some instances, the AMS application allows an operator to initiate communications with a field device to, for example, change parameters within the device and to run applications on the device, such as device configuration, device calibration, status-checking applications, etc.

Moreover, many smart devices also currently include self-diagnostic and/or self-calibration routines that can be used to detect and correct problems within the device. For example, the FieldVue and ValveLink devices made by Fisher Controls International, Inc. have diagnostic capabilities that can be used to correct certain problems. To be effective, however, an operator must recognize that a problem exists with the device and subsequently initiate the self-diagnostic and/or self-calibration features of the device. There are also other process control applications, such as auto tuners, that can be used to correct poorly tuned loops within a process plant. Again, however, it is necessary for an operator or other user to identify a poorly operating loop and subsequently initiate the use of such auto tuners to be effective.

Still further, each device or function block within a process plant may have the capability to detect errors that occur therein and send a signal, such as an alarm or an event to notify a process controller or an operator workstation that an error or some other problem has occurred. However, the occurrence of these alarms or events does not necessarily indicate a long-term problem with the device or loop that must be corrected. For instance, these alarms or events may be generated in response to other factors that were not a result of a poorly performing device or loop. Therefore, because a device or a function block within a loop generates an alarm or event does not necessarily mean that the device or loop has a problem that needs to be corrected. Furthermore, these alarms or events do not indicate the cause of the problem nor the solution to the problem. As a result, an operator or other expert is still required to make the determination of whether a device requires a repair, calibration or some other corrective action in response to an alarm or event, and to subsequently initiate the appropriate corrective action.

Presently, it is known to provide one or more diagnostic tools that use process control variables and information about the operating condition of the control routines, function blocks, devices and other plant assets associated with process control routines to detect poorly operating devices or loops. In response to the detection of a poorly operating device or loop, the diagnostic tool may provide information to an operator about suggested courses of action to correct the problem. For example, the diagnostic tool may recommend the use of other, more specific diagnostic applications or tools to further pinpoint or correct the problem. An operator is then allowed to select which application or tool to execute to correct the problem. An example of such a system is disclosed in U.S. Pat. No. 6,298,454 entitled "Diagnostics in a Process Control System." Similarly, there are other, more complex, diagnostic tools, such as expert systems, correlation analysis tools, spectrum analysis tools, neural networks, etc. that use information collected for a device or a loop to detect and help correct problems therein. In some cases, these diagnostic tools may recommend changes to repairs to devices within the plant, which are then generally approved, scheduled and implemented using a business application, such as a work order generation application.

In addition, in some cases, remote service providers may be connected to the process plant, may receive control and device data and other information from the process plant and may perform one or more analyses on the data and information to detect problems within the plant, to make recommendations for changes in the plant, etc. An example of such a remote system is described in U.S. Patent Application Publication No. 2004/0158474. In this case, the remote service provider may generate and provide recommendations for plant repairs and changes, which may then be acted on by personnel, such as maintenance personnel, within the plant.

As noted above, to maintain efficient operation of the overall process, and thus minimize plant shutdowns and lost profits, devices associated with the process plant must function properly and reliably. Typically, one or more experienced human operators are primarily responsible for assuring that the devices within a process plant are operating efficiently and for repairing and replacing malfunctioning devices. Such operators may use tools and applications, such as the ones described above or other available tools, which provide information about devices within the process. The maintenance applications may be installed in and executed by one or more operator workstations, controllers, maintenance applications, dedicated servers, etc. associated with the process plant to perform monitoring, diagnostic, and maintenance functions.

Many maintenance infrastructures within process plants also include one or more business or work management systems that are used to order, schedule and manage changes within the plant. In many cases, the business and work management systems include work order generation systems, which are used to actually set up, define and create work orders, which are then used to initiate and define work to be performed in the process plant, such as repairing or replacing field devices, tuning devices, calibrating devices, running diagnostics on devices, etc. One such work order generation system is described in detail in U.S. Pat. No. 6,965,806. Still further, common business or work order management systems are implemented using SAP® or MAXIMO enterprise resource system or enterprise asset management software.

Thus, as will be understood, while there are many different diagnostic systems (including either remote or in-plant systems) that may detect the need for changes, upgrades or other repair or maintenance activities in the plant, the results of each of these diagnostic systems must be sent to and reviewed by one or more maintenance personnel within the plant or other plant experts so that these persons can make a determination if and what work needs to be performed within the plant. When these persons determine or decide that particular work or repair activities need to be taken or performed in the plant, these persons must then access the business or work management system and create a work order, which includes entering data pertaining to the plant asset or assets on which work is to be performed, defining the nature of the work or activity to be performed, selecting a priority of the work, etc. In many cases, this activity requires the maintenance personnel to open the work order generation system (part of the work and business maintenance system), and then to manually enter data about the asset or asset, the type of work, etc. to generate the work order. When generated, the work order is sent to or used by maintenance personnel to perform the ordered work or activity. However, in many cases, the maintenance scheduler must retype asset information (such as asset tag information, asset data, asset name, etc.) that is provided by the diagnostic application or from a recommendation from a remote expert, into the work order generation system, which can be tedious and time consuming. Moreover, once the work order is generated, the maintenance person may have no real or may have only very limited ability to understand the status of the work order (whether it is completed, when it is scheduled to be performed, etc.) Still further, the diagnostic systems may, in many cases, recommend the same or similar activity even after a work order has been generated to correct the detected issue. However, the maintenance person may have no or only very limited ability to know this fact, and so may end up generating multiple work orders to correct the same problem. This problem is exacerbated when a remote service provider is providing recommendations for plant changes, as the remote service provider may have no access to the work order generation system within the plant and thus may not be able to know if previous recommendations were accepted or rejected by the plant personnel, are in process, etc.

SUMMARY

A process plant maintenance system includes a work order initiation and tracking system (e.g., implemented as an application) coupled between various plant asset diagnostic systems (which may be remote from the plant or within the plant) and a work or business management system within the plant. The work order initiation and tracking system may include a user interface that enables a user, such as maintenance personnel, to review diagnostic data, recommendations, and other information from one or more of the remote or in-plant diagnostic systems regarding potential or recommended changes to plant assets, and to initiate the generation of one or more work orders to implement recommendations or corrections based on information from the diagnostic systems. The work order initiation and tracking system may assist the user in generating work orders by tracking and viewing the created work orders associated with various assets in the plant based on previous diagnostic information or recommendations, by enabling the user to copy data or information from the diagnostic applications into the work order generation system (thereby reducing work and increasing accuracy in the generation of work orders), by translating or associating data, such as asset name and tag data, from the diagnostic systems to the work order generation system to assure that the correct assets are identified in the work orders, and by tracking the progress of the work orders sent to and generated by the business and work management system to provide the user with information pertaining to previously ordered work within the plant. This last benefit helps to reduce the generation of multiple work orders for the same problem.

Still further, the work order initiation and tracking system may include a rules engine that may operate automatically on data from various ones of the diagnostic systems to initiate a work order. Such a rules engine may access a set of stored rules (logic) to be applied to information or messages from the various different diagnostic systems, and may use the rules to detect various pre-determined conditions under which the work order initiation and tracking system is to automatically generate a work order, without much or any human involvement. This automated analysis system operates must faster and more efficiently to generate various work orders in pre-specified conditions.

Still further, the work order initiation and tracking system may track the status of various work orders that have been previously generated and use this status in generating additional work orders. In some cases, the work order initiation and tracking system may detect that a work order has been previously generated (but not yet acted on) to correct a problem that is newly identified by one of the diagnostic systems, and may alert the user of such a state, to prevent the generation of multiple work orders in solving the same problem or issue. Moreover, the work order initiation and tracking system may perform a search for all work orders (and determine the status of such work orders) generated for a specific plant asset or assets, and may provide such a list to the user when the user is acting on a recommendation or notification from one of the diagnostic systems, to help the user understand what actions (work) is already in progress for the effected asset(s). This tracking activity may enable the user to create better or more comprehensive work orders in solving problems within the plant. Still further, the work order initiation and tracking system may provide status information to remote users, such as indications of whether a recommendation action was accepted in the plant, whether one or more work orders were generated based on that recommendation, and the status of those work orders.

DETAILED DESCRIPTION

Figure 1:
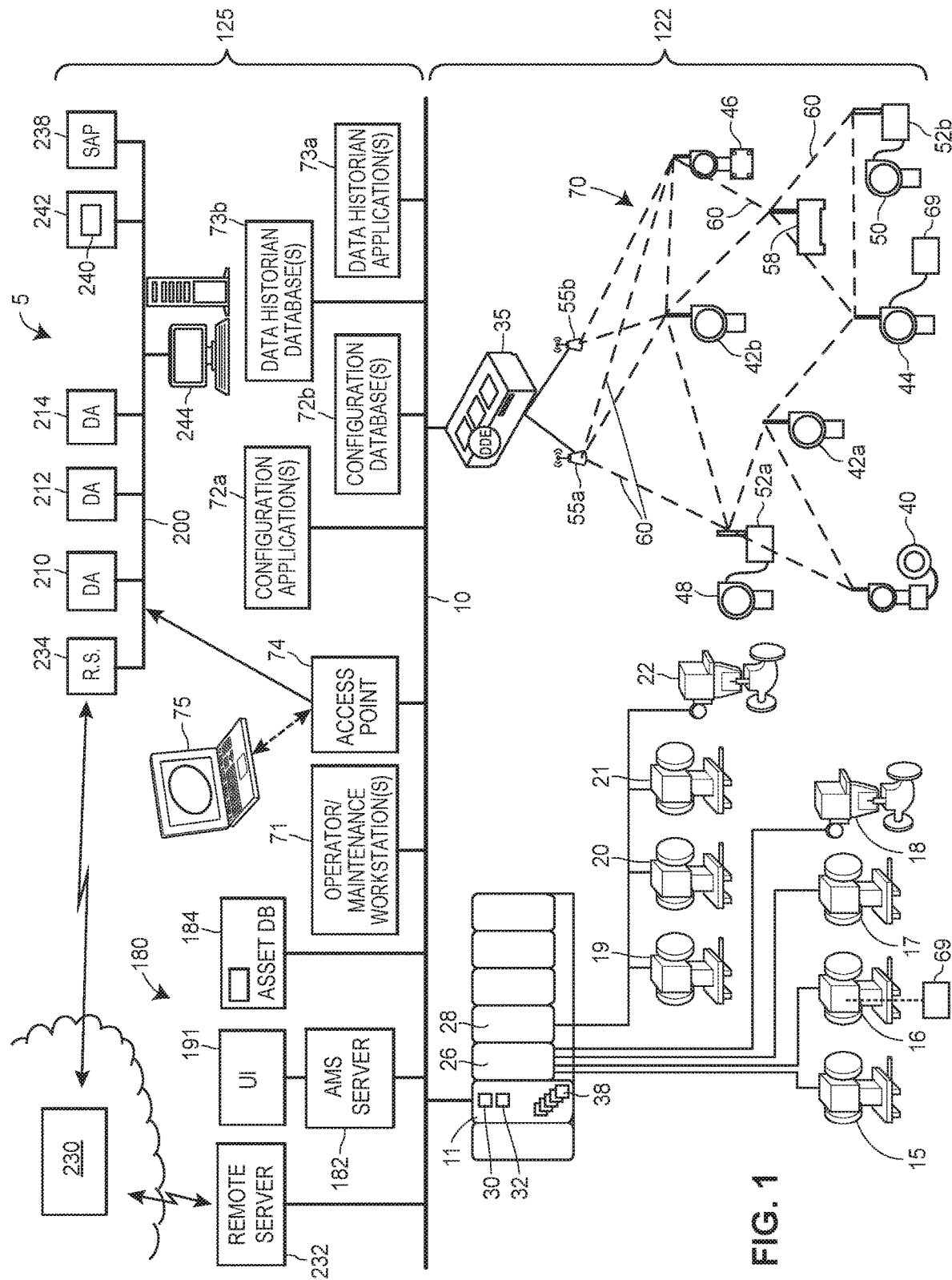
FIG. 1 is a schematic diagram of a service or maintenance system within a process plant that is in communication with multiple in-plant and remote diagnostic and analysis systems and that is coupled to a business and work management system.

FIG. 1 depicts a diagram of an example process plant, process control system, or process control environment 5 including one or more asset analysis and business management systems that perform activities within the plant 5 to analyze and manage changes and repairs within the plant 5. Generally speaking, the process plant 5 includes one or more process controllers that, during run-time, may receive signals indicative of process measurements made by field devices, process this information to implement a control routine, and generate control signals that are sent over wired or wireless process control communication links or networks to the same or other field devices to control the operation of a process in the plant 5. Typically, at least one field device performs a physical function (e.g., opening or closing a valve, increasing or decreasing a temperature, etc.) to control the operation of a process, and some types of field devices communicate with controllers using input/output (I/O) devices. Process controllers, field devices, and I/O devices may be wired or wireless, and any number and combination of wired and wireless process controllers, field devices and I/O devices may be included in the process plant environment or system 5.

For example, the process plant 5 depicted in FIG. 1 includes a process controller 11 that is communicatively connected to wired field devices 15-22 via I/O cards 26 and 28, and that is communicatively connected to wireless field devices 40-46 via a wireless gateway 35 and a process control data highway or backbone 10 (which may include one or more wired and/or wireless communication links, and may be implemented using any desired or suitable or communication protocol such as, for example, an Ethernet protocol). In some cases, the controller 11 may be communicatively connected to the wireless gateway 35 using one or more communication networks other than the backbone 10, such as by using any number of other wired or wireless communication links that support one or more communication protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, Profibus, FOUNDATION® Fieldbus, etc.

The controller 11, which may be, by way of example, the DeltaV controller sold by Emerson Process Management, may operate to implement one or more batch or continuous processes using at least some of the field devices 15-22 and 40-46. Moreover, in addition to being communicatively connected to the process control data highway 10, the controller 11 is also communicatively connected to at least some of the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the WirelessHART® protocol, the CAN protocol, the Profibus protocol, etc. In FIG. 1, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controller 11 of FIG. 1 includes a processor 30 that implements or oversees one or more process control routines 38 (e.g., that are stored in a memory 32). The processor 30 is configured to communicate with the field devices 15-22 and 40-46 and with other process control devices communicatively connected to the controller 11. It should be noted that any control routines or modules described herein may have parts thereof implemented or executed by different controllers or other devices if so desired. Likewise, the control routines or modules 38 described herein which are to be implemented within the process control system 5 may take any form, including software, firmware, hardware, etc. Control routines may be implemented in any desired software format, such as using object oriented programming, ladder logic, sequential function charts, function block diagrams, or using any other software programming language or design paradigm. The control routines 38 may be stored in any desired type of memory 32, such as random access memory (RAM), or read only memory (ROM). Likewise, the control routines 38 may be hard-coded into, for example, one or more EPROMs, EEPROMs, application specific integrated circuits (ASICs), or any other hardware or firmware elements. Thus, the controller 11 may be configured to implement a control strategy or control routine in any desired or known manner.

In some cases, the controller 11 may implement a control strategy using what are commonly referred to as function blocks, wherein each function block is an object or other part (e.g., a subroutine) of an overall control routine and operates in conjunction with other function blocks (via communications called links) to implement process control loops within the process control system 5. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 5. Of course, hybrid and other types of function blocks exist. Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. The controller 11 may include one or more control routines 38 that may implement one or more control loops that may be performed by executing one or more of the function blocks.

The wired field devices 15-22 may be any types of devices, such as sensors, valves, transmitters, positioners, etc., while the I/O cards 26 and 28 may be any types of I/O devices conforming to any desired communication or controller protocol. In FIG. 1, the field devices 15-18 are standard 4-20 mA devices or HART® devices that communicate over analog lines or combined analog and digital lines to the I/O card 26 (also referred to herein as "non-smart" or "dumb" devices), while the field devices 19-22 are smart devices, such as FOUNDATION® Fieldbus field devices, that communicate over a digital bus to the I/O card 28 using a FOUNDATION® Fieldbus communications protocol. In some embodiments, though, at least some of the wired field devices 15, 16 and 18-22 and/or at least some of the I/O cards 26, 28 additionally or alternatively communicate with the controller 11 using the process control data highway 10 and/or by using other suitable control system protocols (e.g., Profibus, DeviceNet, Foundation Fieldbus, ControlNet, Modbus, HART, etc.).

In the example process plant 5 of FIG. 1, the wireless field devices 40-46 communicate via a wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the same or another wireless protocol). To communicate with one or more other nodes that are not configured to communicate wirelessly, the wireless field devices 40-46 may utilize a wireless gateway 35 connected to the process control data highway 10 or to another process control communications network. The wireless gateway 35 provides access to various wireless devices 40-58 of the wireless communications network 70. In particular, the wireless gateway 35 provides communicative coupling between the wireless devices 40-58, the wired devices 11-28, and/or other nodes or devices of the process control plant 5. For example, the wireless gateway 35 may provide communicative coupling by using the process control data highway 10 and/or by using one or more other communications networks of the process plant 5.

Similar to the wired field devices 15-22, the wireless field devices 40-46 of the wireless network 70 perform physical control functions within the process plant 5, e.g., opening or closing valves, or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 5, the wireless network 70 includes non-wireless devices. For example, in FIG. 1, a field device 48 is a legacy 4-20 mA device and a field device 50 is a wired HART® device. To communicate within the network 70, the field devices 48 and 50 are connected to the wireless communications network 70 via a wireless adaptor 52*a*, 52*b*. The wireless adaptors 52*a*, 52*b* support a wireless protocol, such as WirelessHART, and may also support one or more other communication protocols such as Foundation® Fieldbus, Profibus, DeviceNet, etc. Additionally, in some configurations, the wireless network 70 includes one or more network access points 55*a*, 55*b*, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In FIG. 1, the wireless devices 40-46 and 52-58 communicate with each other and with the wireless gateway 35 over wireless links 60 of the wireless communications network 70, and/or via the process control data highway 10. Moreover, in some cases, a handheld communication device 69 may be used to communicate with one or more of the field devices 15-22, 40-58 or other devices (e.g., gateways 35, controllers 11, I/O devices 26, 28, etc.) directly to thereby enable a maintenance person or other user to communicate with, alter the configuration of, and commission the device directly. The handheld device 69 may communicate with the other process plant assets directly, may communicate through a direct wired or wireless communication link temporarily established between the installed plant device and the handheld device 69, or may communicate with a plant asset via an access point on a network or other communication link established as part of the permanent or run-time plant communication network. The user may use the handheld device 69 to perform some activity on a field device or other plant asset, may store information such as device information about this activity, and may later download that information to one or more databases, such as a configuration database or an asset management database discussed below.

As illustrated in FIG. 1, the process control system 5 also includes one or more operator and/or maintenance workstations 71 that are communicatively connected to the data highway 10. Using the operator and maintenance workstations 71, operators or maintenance personnel may view and monitor real-time operations of the process plant 5, as well as take any diagnostic, corrective, maintenance, and/or other actions that may be required. Generally speaking, operators take actions to change the ongoing operation of the plant during run-time to thereby cause the plant control system to work better. On the other hand, maintenance personnel generally view data pertaining to the operational states or statuses of various devices in the plant and take actions to maintain, repair, calibrate, etc. the devices to assure that the devices are operating in a manner that enables the control system to perform satisfactorily. At least some of the operator and maintenance workstations 71 may be located at various, protected areas in or near the plant 5, and in some situations, at least some of the operator and maintenance workstations 71 may be remotely located, but nonetheless be in communicative connection with the plant 5. The operator and maintenance workstations 71 may be wired or wireless computing devices.

The example process control system 5 is further illustrated as including a configuration application 72a and configuration database 72b, each of which is also communicatively connected to the data highway 10. Various instances of the configuration application 72a may execute on one or more computing devices (not shown) to enable users to create or change process control modules and download these modules via the data highway 10 to the controllers 11, as well as enable users to create or change operator interfaces via which an operator is able to view data and change data settings within process control routines. The configuration database 72b stores the created (e.g., configured) modules and/or operator interfaces. Additionally, the configuration database 72b stores a set of defined or baseline commissioning parameters associated with any of the field devices 15-22, 40-46. Generally, the configuration application 72a and configuration database 72b are centralized and have a unitary logical appearance to the process control system 5, although multiple instances of the configuration application 72a may execute simultaneously within the process control system 5, and the configuration database 72b may be implemented across multiple physical data storage devices. Accordingly, the configuration application 72a, the configuration database 72b, and the user interfaces thereto (not shown) comprise a configuration or development system 72 for control and/or display modules. Typically, but not necessarily, the user interfaces for the configuration system 72 are different than the operator and/or maintenance workstations 71, as the user interfaces for the configuration system 72 are utilized by configuration and development engineers irrespective of whether or not the plant 5 is operating in real-time, whereas the operator and maintenance workstations 71 are typically utilized by operators during real-time operations of the process plant 5.

The example process control system 5 also includes a data historian application 73a and a data historian database 73b, each of which is also communicatively connected to the data highway 10. The data historian application 73a operates to collect some or all of the data provided across the data highway 10, and to historize or store the data in the historian database 73b for long term storage. Similar to the configuration application 72a and the configuration database 72b, the data historian application 73a and the historian database 73b are typically centralized and have a unitary logical appearance to the process control system 5, although multiple instances of a data historian application 73a may execute simultaneously within the process control system 5, and the data historian database 73b may be implemented across multiple physical data storage devices.

In some configurations, the process control system 5 includes one or more other wireless access points 74 that communicate with other devices using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as NFC and Bluetooth, or other wireless communication protocols. Typically, such wireless access points 74 allow handheld or other portable computing devices (e.g., user interface devices 75) to communicate over a respective wireless process control communication network that is different from the wireless network 70 and that supports a different wireless protocol than the wireless network 70. For example, a wireless or portable user interface device 75 may be a mobile workstation or may be diagnostic test equipment that is utilized by an operator or maintenance person within the process plant 5 (e.g., an instance of one of the operator or maintenance workstations 71). In some scenarios, in addition to portable computing devices, one or more process control devices (e.g., the controller 11, the field devices 15-22, the I/O devices 26, 28, or the wireless devices 35, 40-58) also communicate using the wireless protocol supported by the access points 74.

It is noted that although FIG. 1 only illustrates a single controller 11 with a finite number of field devices 15-22 and 40-46, wireless gateways 35, wireless adaptors 52, access points 74, routers 58, and wireless process control communications networks 70 included in the example process plant 5, this is only an illustrative and non-limiting embodiment. Any number of controllers 11 may be included in the process control plant or system 5, and any of the controllers 11 may communicate with any number of wired or wireless devices and networks 15-22, 40-46, 35, 52, 55, 58 and 70 to control a process in the plant 5.

Further, it is noted that the process plant or control system 5 of FIG. 1 includes a field environment 122 (e.g., "the process plant floor 122") and a back-end environment 125 which are communicatively connected by the data highway 10. As shown in FIG. 1, the field environment 122 includes physical components (e.g., process control devices, networks, network elements, etc.) that are disposed, installed, and interconnected therein to operate to control the process during run-time. For example, the controller 11, the I/O cards 26, 28, the field devices 15-22, and other devices and network components 40-46, 35, 52, 55, 58 and 70 are located, disposed, or otherwise included in the field environment 122 of the process plant 5. Generally speaking, in the field environment 122 of the process plant 5, raw materials are received and processed using the physical components disposed therein to generate one or more products.

The back-end environment 125 of the process plant 5 includes various components such as computing devices, operator workstations, databases or databanks, etc., that are shielded and/or protected from the harsh conditions and materials of the field environment 122. Referring to FIG. 1, the back-end environment 125 includes, for example, the operator and maintenance workstations 71, the configuration or development systems 72 for control modules and other executable modules, data historian systems 73, and/or other centralized administrative systems, computing devices, and/or functionality that support the run-time operations of the process plant 5. In some configurations, various computing devices, databases, and other components and equipment included in the back-end environment 125 of the process plant 5 may be physically located at different physical locations, some of which may be local to the process plant 5, and some of which may be remote.

As discussed herein, the configuration database(s) 72b may be disposed in the back-end environment 125 of the process plant 5, and may be used for commissioning purposes. The configuration database(s) 72b may store, among other things, data and other information that specifically identifies and/or addresses the various devices or components and their interconnections that are planned for or desired to be implemented on the process plant floor or field environment 122. Some of this commissioning data may be provided to components in the field environment 122 for use in commissioning of devices and loops therein, and some of this data may be utilized in the back-end environment 125, e.g., for the design, development, and preparation of control modules and/or operator interface modules that will operate in conjunction with the field environment 122 during live operations of the process plant 5.

Still further, as illustrated in FIG. 1, an asset maintenance system 180 provides various information to one or more users, such as maintenance personnel, via for example, one or more of the maintenance interfaces 71 or other dedicated interfaces regarding the status or state of various ones of the field devices, controllers, I/O devices, or other assets within the front-end or field environment 122 of the plant 5. More particularly, the asset management system 180 may include a dedicated asset management computer or server 182 (and an associated user interface 191), and one or more asset management databases 184.

Still further, as illustrated in FIG. 1, a plant-wide web (LAN) or data highway 200 is connected to the access point 74 and connects various analytic and business systems within the plant 5. In particular, as illustrated in FIG. 1, various data analytic systems 210, 212 and 214 are connected to the LAN 200. The data analytic systems 210, 212 and 214 are referred to herein as in-plant data analytic systems as they are located in the plant 5 and receive data from the plant 5. These systems may operate in any known manner to make recommendations or suggestions for changes to be made in the plant 5. Moreover, data analytic systems 210, 212 and 214 may be part of and/or may incorporate aspects of other known systems, such as maintenance systems (e.g., the AMS system 180), control systems (such as information within the workstations 71 and the databases 72 and 73), the configuration system (such as the configuration system 72), etc. Generally speaking, the data analytic systems 210, 212 and 214 may run or execute various programs or routines on data from the plant (e.g., process data, alerts and alarm data, etc.) to detect poorly operating equipment in the plant 5 and notify a user of problems, or potential problems in the plant 5, and may make recommendations for changes. The data analytic systems 210, 212 and 214 may then generate and send condition or recommendation messages to users (e.g., maintenance personnel) indicating the detected existence of a significant condition in the plant and/or a recommendation for modifying one or more assets in the plant 5 to make the plant 5 run better, or to alleviate or reduce a problem in the plant 5.

Likewise, one or more external or remote data analytic applications or sources may be connected to the plant 5. In particular, a remote expert system 230 is connected to the plant 5 via a remote server 232 to receive various data, including control data, maintenance data, configuration data, historical data asset data, etc. from the plant 5. The remote data analytic application or source 230 may be located outside of the plant environment or facility and may operate to analyze the plant data to detect potential problems in the plant, and make recommendations for changes in the plant 5 to correct, reduce or alleviate the detected problems. If desired, the remote data analytic application or source 230 may run various data analytic applications or programs, may provide an expert with the plant data or processed plant data to enable the expert to make recommendations for the plant 5, or both. In any event, the remote data analytic application or source 230 may send notifications of problems and/or recommendations or suggested changes to be made to assets within the plant 5 to one or more operation interfaces or applications within the back-end 125 of the plant 5 via the remote server 232 or another external gateway 234 connected to the LAN 200.

Still further, as illustrated in FIG. 1, a business or work management system 238 is connected to the LAN 200 and receives inputs or data from various other devices on the LAN 200. In this case, the work management system 238, which may be an SAP or a MAXIMO system or any other business or work management system, includes a work order generation application or utility that generates and appropriately distributes work orders to personnel in the plant 5 responsible for implementing repair activities described in the work orders.

Importantly, as illustrated in FIG. 1, a work order initiation and tracking system 240 is disposed in and is executed by one or more servers 242 which may or may not include user interfaces connected thereto. Generally speaking, the work order initiation and tracking system 240 operates as a go-between device between the internal data analytic systems 210, 212 and 214 and, in some cases, the remote analytic system 230, and the business or work order management system 238 to assist in the creation and/or initiation of work orders in response to recommendations or other data from the data analytic systems 210, 212, 214 and 230. The work order initiation and tracking system 240 may include a user interface that enables one or more users, such as maintenance personnel, to review diagnostic data and information from one or more of the remote or in-plant diagnostic systems 210, 212, 214 and/or 230, and to generate one or more work orders (that will be used to implement recommendations or corrections) based on information from the diagnostic systems. In particular, the user may use the system 240 to create and send the work order initiation commands to the business and work management system 238 for creation of one or more work orders in the normal course. The work order initiation and tracking system 240 may also assist the user in generating work orders by tracking the work orders associated with various assets in the plant 5 based on previous diagnostic information or recommendations, by enabling the user to copy data or information from the diagnostic applications into the work order generation system (thereby reducing work and increasing accuracy when generating work orders), by translating or associating data, such as asset name and tag data, from the paradigm or vernacular of the diagnostic systems 210, 212, 214 and 230 to that of the work management system 238, and by tracking the progress of the work orders sent to and generated by the business and work management system 238 to provide the user with information pertaining to previously ordered work within the plant, and to help reduce the generation of multiple work orders for the same problem.

Still further, the work order initiation and tracking system 240 may include a rules engine that may operate automatically on various data from various ones of the diagnostic systems 210, 212, 214 and 230, to initiate a work order. Such a rules engine may include or may access sets of logic to be applied to information or messages from the various different diagnostic systems 210, 212, 214, 230, etc., to detect various pre-determined conditions under which the work order initiation and tracking system 240 will automatically generate a work order, without much or any human involvement. Still further, the work order initiation and tracking system 240 may track the status of various work orders that have been previously generated and use this status in generating additional work orders. In some cases, the work order initiation and tracking system 240 may detect that a work order has been previously generated (but not yet acted on) to correct a problem that is newly identified by one of the diagnostic systems 210, 212, 214 and 230, and may alert the user of such a state, to prevent the generation of multiple work orders in solving the same problem or issue. Moreover, the work order initiation and tracking system 240 may perform a search for all work orders (and the status of such work orders) generated for a specific plant asset or assets, and may provide such a list to the user when the user is acting on a recommendation or notification from one of the diagnostic systems 210, 212, 214 and 230, to help the user understand what action (work) is already in progress for the effected asset(s). This tracking activity may enable the user to create better or more comprehensive work orders in solving problems within the plant. Likewise, the work order initiation and tracking system 240 may provide feedback to the data analytic systems 210, 212, 214 and/or 230, and especially to the remote system 230, to provide information to those systems as to any actions taken on recommendations or notifications by those systems. This feedback will assist those systems (especially the expert remote system 230) in knowing what work (plant changes) is in progress when making future recommendations.

Figure 2:
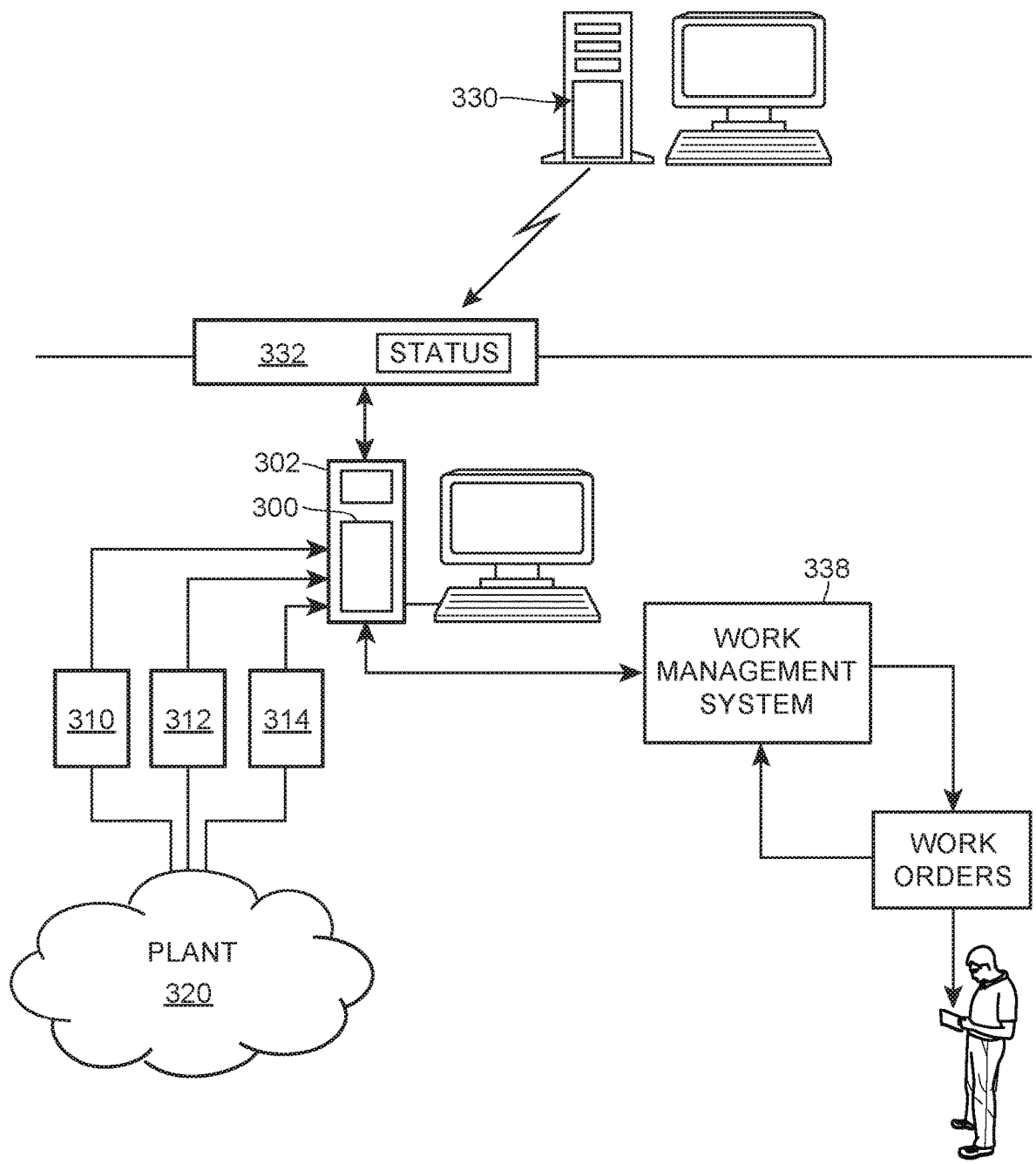
FIG. 2 is a schematic block diagram of data flow between the maintenance system and the diagnostic and work order generation systems within the process plant of FIG. 1.

FIG. 2 illustrates a simplified data flow diagram depicting data flow between some the components of the maintenance system in FIG. 1. As illustrated in FIG. 2, a work order initiation and tracking system 300, which may be the work order initiation and tracking system 240 of FIG. 1, is disposed in a server or other computer device 302 and is communicatively coupled to numerous in-plant data analytic systems 310, 312, 314 (which are also monitoring systems), which, in turn, are coupled to a plant environment 320, which may be, for example, the plant 5 of FIG. 1. Likewise, the work order initiation and tracking system 300 is connected to one or more remote data analytic systems 330 via a plant interface or server 332. Generally speaking, the data analytic systems 310, 312, 314 and 330 receive data from the plant 320 and process that data in any of various ways to detect problems within the plant 320 and to make recommendations to one or more users for changes to be made within the plant 320, such as changes to assets within the plant 320. In one example, the remote analytic system 330 may be an expert system which receives data from a plant 320 either via the interface 332 or through other connections, such as those shown in FIG. 1, and may operate on or analyze that data to determine problems within the plant 320 and more particularly with assets within the plant 320 and/or to make recommendations for changes in the plant 320, such as calibrating devices, running various diagnostics in the plant, changing valve packing, repairing or replacing devices, or performing any other repair or modification work. The remote expert system 330 may then send these recommendations via the interface 332 to the work order initiation and tracking system 300 for use therein in generating or initiating work orders, where appropriate.

Figure 3:
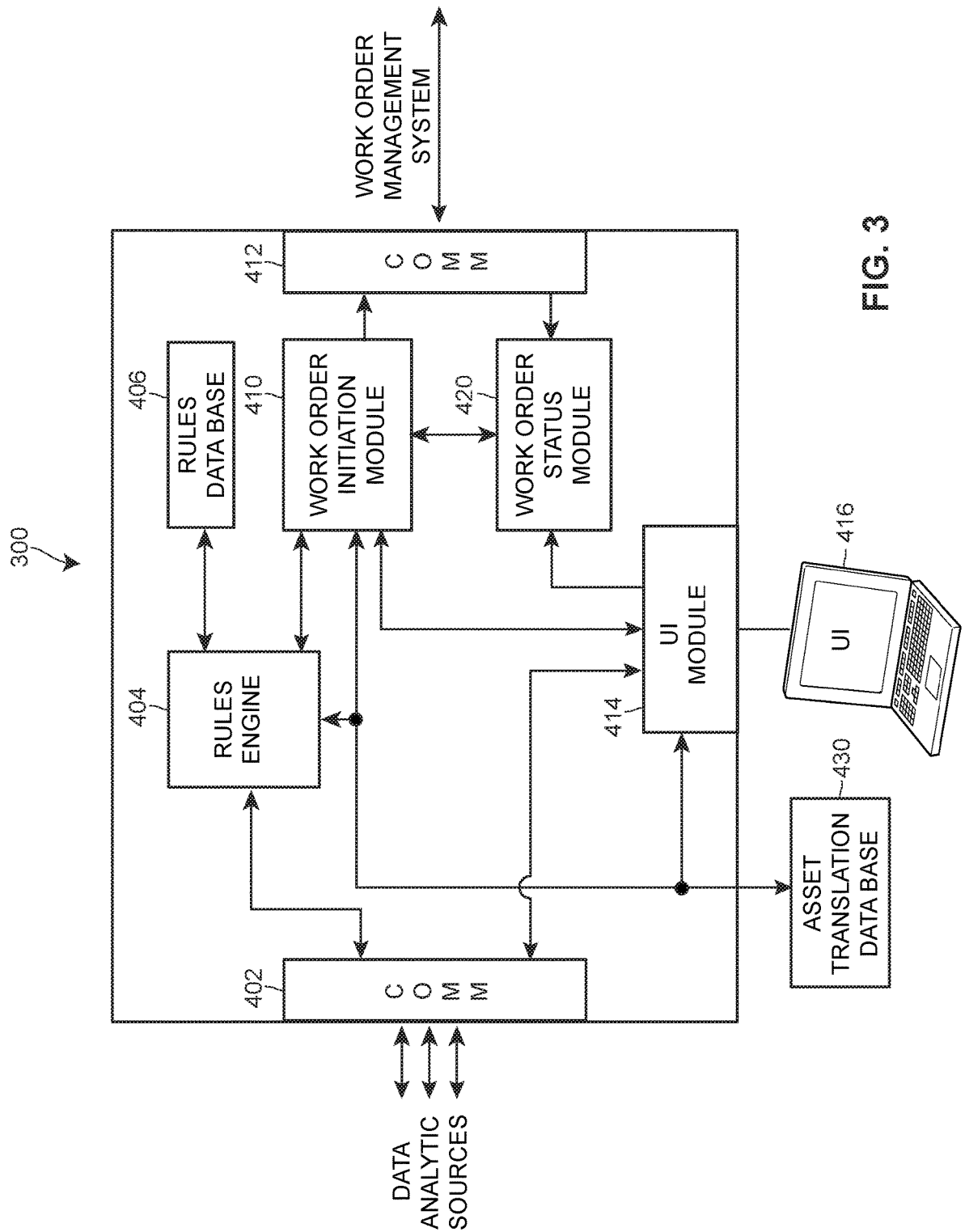
FIG. 3 is a block diagram of a work order initiation and tracking system of FIG. 2.

FIG. 3 depicts the work order initiation and tracking system 300 of FIG. 2 in more detail. In particular, the work order initiation and tracking system 300 includes an input communication interface 402, which interfaces with one or more data analytic sources, such as the data analytic systems or monitoring systems 310, 312, 314 and 330 of FIG. 2, and receives data from those sources. The received data may include recommendations regarding assets which have problems or for which work orders may need to be generated. Still further, the work order initiation and tracking system 300 includes a rules engine 410 and a rules database 412, which may operate on data from the data analytic sources 310, 312, 314 and 330 to determine if one or more work orders need to be created automatically. The work order initiation and tracking system 300 also includes a work order initiation module 410 and an output communication interface 412, which communicates with a work and business management system, such as the system 338 of FIG. 2 or 238 of FIG. 1, to instruct the work order generation system within the business management system 238, 338 to generate one or more particular work orders and provides the needed information for the creation and generation of these work orders.

Still further, the work order initiation and tracking system 300 includes a user interface communication module 414, which communicates with a user via a user interface 416 (which may be any of the user interfaces of FIG. 1 or FIG. 2). The user interface communication module 414 enables a user to interface with the system 300, and enables the system 300 to assist a user in generating or initiating work orders via the work/business management system 338 of FIG. 2 based on recommendations or other information from the data analytic sources 310, 312, 314 and 330. Additionally, the work order initiation and tracking system 300 includes a work order status database 420, which is coupled to the output communication interface 412, and operates to log work orders that are generated, and to receive information from the work and business management system 338 (or other exterior work order generation system) to track the status of various work orders that have been created. Work order status information may include the state of each created work order in terms of a work order being issued by the work order management system, such as whether the work order has been created, whether the work order has been promulgated to a maintenance worker, if a work order has been accepted by a maintenance worker, is complete, is cancelled, is in process, or is in some other state, such as whether a work order has been declined or is not able to be completed.

As illustrated in FIG. 3, the system 300 may be connected to or may include an asset translation database 430 which may store information about the various plant assets as these assets are referred to or known in each of the data analytic systems 310, 312, 314 and 330. The asset translation database 430 may, for example, store asset names, tags, device IDs, or other asset information for each asset, as that information is used in each of the different data analytic systems that is providing recommendations to the system 300, and as that same asset is referred to in the work order management system 338, to thereby enable the system 300 to create a work order for a particular asset using the paradigm or nomenclature of the work order generation system 340 when one or more of the data analytic systems uses a different naming or asset paradigm for the same asset. In this manner, when the system 300 generates or assists a user in generating a work order via the business management system 338, the system 300 may automatically translate the asset information as used by the recommending system into asset information as used by the work order generation system 338. The translation database 430 thus enables the work order initiation module 410 to initiate a work order for the correct asset in the plant 320 even when the asset might be referred to differently (e.g., with a different name, tag, path, etc.) in the data analytic system making the recommendation.

During operation, the work order initiation and tracking system 300 may operate in one of various different modes or operating states to perform functions with respect to generating work orders, tracking the status of those work orders, and providing work order status information to users via the user interface 416, for example. In particular, in a first, more rudimentary mode, the system 300 may simply assist a user, such as a maintenance person or maintenance expert, who might be connected to the system 300 via the user interface 416, to generate and track work orders using the work and business management system 338 in a more efficient manner. In particular, in this case, the system 300 may receive, via the input communication interface 402, recommendations or other data indicating problems within the plant 320 as generated by one of the data analytic sources or monitoring systems 310, 312, 314 and 330. As illustrated in FIG. 3, this data may be provided via the user interface module 414 to the user interface 416 using one or more specialized or predetermined interface screens which enable a user at the user interface 416 to understand the recommendation and/or to view and understand the other data about the asset and/or the assets to which the recommendation pertains. In this manner, the system 300 enables a user to view recommendations or suggestions for asset changes from various different analytic, monitoring or expert systems in a single place using a common format, which makes these recommendations easier to understand, process and track. As part of this process, the user interface module 414 may provide enough information to the user for the user to understand the problem with the asset and to make a determination as to whether or not a work order should be created to fix or change the asset. In some cases, this decision may take the form of accepting or rejecting a suggested change or recommendation from one of the data analytic sources, such as a remote data analytic system 330. Additionally, in this mode, the user interface module 416 may interface with the tracking status module 420 to determine whether any previous work orders have been generated for the affected asset, to determine the status of those work orders at the current time, etc. This information may be provided by the user interface module 414 to the user interface 416 to allow the user to better understand the state of repair of the plant asset in the process of determining whether it is beneficial or necessary to generate a new work order for a particular recommendation. In many cases, despite a recommendation for a change in the system or plant asset by one of the data analytic systems 310, 312, 314 or 330, the user may use the work order status information to determine that a work order has already been generated for that asset, and/or may enable the user to decide that a work order does not need to be generated because it is not important in light of other work orders that exist. In other cases, the user may already be familiar with the problem within the plant 320 and can use the information provided by the user interface module 414 to determine that the problem is being solved in some other manner, or to determine that the problem is a problem that does not need to be solved or addressed at this time.

The user interface module 414 may also enable the user (via the user interface 416) to generate a work order by copying data or importing data as provided in the messages from the data analytic sources (via the input communication interface 402) into a work order initiation form and, if needed, may use the asset translation database 430 to translate data regarding assets, such as asset names, plant names, etc. when the user is filling out the work order initiation form. When the user has created and filled out a work order initiation form indicating the work order to be generated and the asset to which it pertains, the user interface module 414 may provide that information to the work order initiation module 410, which will then create a work order initiation message or order and send such an order through the output communication interface 422 to the work and business management system 338 to actually generate the work order therein and promulgate that work order to a maintenance person for action.

After a work order is generated and is assigned to a repair or maintenance person, the work and business management system 338 may track the status of that work order (e.g., whether it is accepted, declined, in progress, finished, etc.) via interaction with the maintenance person, and then provides messages back to the system 300 via the output communication interface 412 about the status of that work order. Such status information may be provided to and stored within the status tracking module 420 of the system 300. In this manner, the system 300 enables the user, via the user interface 416, to understand and track various work orders which have been created and are in process, to track which work orders have been completed, etc. by the business management system 338 in a simple and easy-to-view manner. Moreover, this system enables a user to easily access work order status information when actually looking at other recommendations from the data analytic sources 310, 312, 314, 330, in the process of deciding when and whether to act on a recommendation or other information from one of the data analytic sources 310, 312, 314 and/or 330. In this manner, the system 300 helps a user manually create work orders in a consistent and coherent manner and also enables the user to track the status of those work orders within the business management system 338.

In another mode of operation, the system 300 may automatically create work orders based on information from one or more of the data analytic sources 310, 312, 314 and 330. In this case, the rules engine 404, which is a logic engine or logic analyzer, may analyze the data within the messages or files from the data analytic sources 310, 312, 314 and 330 as provided via the input communication module 402 by applying the conditions or rules within a set of rules in the rules database 406 to determine if a predetermined set of conditions is met (as defined by each of the rules). In this case, the rules engine 404 may determine if certain logical conditions (as defined by the rules in the rules database 406) associated with the data are true or are met. If one of the rules is met (i.e., if the logic or predetermined set of conditions defined by one of the rules is met), the rules engine 404 may automatically create a work order for the associated asset by sending appropriate asset information to the work order initiation module 410, which will then create a work order initiation message and send this message to the work management system 338 via the output communication module 412. In some cases, the rules engine 404 may indicate that the order was automatically created via the user interface module 414 and/or may provide the user with the ability to accept or reject the automatic creation of the rule in an easy manner, such as by clicking a radio button accepting or rejecting the creation of the automatically generated work order.

As an example, the rules database 406 may store and the rules engine 404 may implement a rule that looks for a predetermined set of conditions within data from or a recommendation from a data analytic source 310, 312, 314 or 330. As an example, the logic of the rule may specify that a work order is to be created automatically if the recommendation that comes from the data analytic source has a certain level of a priority (e.g., a "high" priority"), that the health value of the asset for which the work order is to be created is below a certain level (e.g., is low enough that it falls below a particular health level), and that no work order is open for this asset, which may be determined from the status tracking module 420. If the rules engine 404 determines that these predetermined conditions are met, the rules engine 404 may initiate the creation of a work order via the work initiation module 410 for the asset. Of course, any number of rules could be stored in the rules database 406 and used by the rules engine 404 to analyze each of the incoming recommendations or messages from the data analytic sources 310, 312, 314 and 330, and the rules in the rules database 406 may be created by, added to, adapted by, or changed by users with appropriate privileges, in order to enable the rules engine 404 to be robust in nature and adaptable in specific circumstances (that is, to be adapted to the needs of different users in different plant environments). Still further, the rules engine 404, the work order initiation module 410, and the user interface module 414 may use the asset translation database 430 to identify or associate the appropriate assets as identified by each of the different data analytic sources with the same asset as referred to or known within the work and business management system 338, in order to ensure that the assets to which recommendations are made by the data analytic sources 310, 312, 314 and 330 are the same assets for which the work order is generated. This translation feature enables the data analytic sources to have slightly different nomenclature or information about the assets for which recommendations are being made, than the specific nomenclature used in the work order and business management system 338, thereby making the system 300 more robust and eliminating the need for users to recognize potential differences between asset names and other data between those systems.

In one specific example of operation of the system 300, the monitoring systems (e.g., the in-plant data analytic systems 310, 312, 314 or the remote system 330) receives and analyzes data from the plant 320. When a significant asset-based condition is detected, these analytic system may generate and send an asset recommendation or asset condition message (e.g., a message relating to the detected state of an asset or a recommendation regarding the need for a change or repair of an asset) to the work order initiation and tracking system 300. This message may include any needed data, such as asset identification data, condition data, recommendation data, one or more priorities of the condition or message, etc. In some cases, the work order initiation and tracking system 300 may poll the data analytic systems 310, 312, 314 and/or 330 for these messages or the data analytic systems 310, 312, 314 and/or 330 may automatically create and send this data to the system 300 in normal course as the conditions are detected. In any event, when one of the in-plant monitoring systems 310, 312, 314 or the remote system 330 detects a significant asset problem or condition and then creates and sends a message of that condition (which message may include a recommendation for an asset change) to the work order initiation and tracking system 300, the system 300 receives and processes this message. If desired, the remote server 332 of FIG. 2 may store this message and a status of this message before forwarding the message to the system 300. Either or both of the server 332 and the user interface module 414 may log recommendation or asset condition messages and may store additional data about the status of the messages, such as the specific data about various recommendations in the messages, the assets to which these messages pertain, indications of whether and when the recommendation or other condition message was received and sent, and a description of and state of the actions taken on the recommendation or condition messages, such as whether the message has been reviewed, if one or more work orders have been generated for the message, the status of such work orders, etc.

In any event, the system 300 may act on a condition or a recommendation message manually, automatically or both. In a manual case, the condition or recommendation message and the data associated therewith is provided, via the user interface module 414, to the user at the user interface 416. The user interface module 414 may put the received information in a consistent form or may use a set of predetermined displays to present the appropriate information to the user. Such forms or displays may include the name and location of the asset, the detected condition or recommendation, a priority of the message or condition, a priority of or a heath indication of the asset (which may be obtained from the message or from a maintenance database in the plant 320, for example), a list of other work orders (past and/or currently outstanding work orders) for the asset (as determined from the work order status module 420), the status of the other work orders, if any exist, as well as any other information. The system 300 may obtain any of this information from any of the plant systems described in FIG. 1, including the configuration, control and maintenance systems, as well as from the data analytic sources 310, 312, 314 and/or 330 themselves, or from the asset translation database 430. Generally, the user interface module 414 provides the information about the asset, the detected condition of the asset and any recommendations for changes to a user in a consistent format to enable the user to understand the recommendation and to take one or more actions, such as generating a work order, declining a work order or taking some other action associated therewith, regardless of the data analytic source that generated the condition or recommendation message.

Still further, the user interface module 414 may enable the user to take an action with respect to the condition or recommendation message via a consistent interface. Such an action may be to decline or ignore the recommendation or message, to delete the recommendation or message or to create a work order based on the recommendation or message. If the user wants to create a work order, the user interface module 414 may assist the user in filling out or populating a form specifying the specifics of the work order to be created, including the targeted asset or assets and identifying information therefor, the priority and timing of the work order, and any other information needed. The user interface module 414 may automatically fill out the work order initiation form (e.g., an asset name, asset tag, asset path, calibration and repair information, an action to be taken in the work order, a priority, etc.) using data from the condition or recommendation message and/or by obtaining this information from other plant systems, such as the asset translation database 430, a maintenance, control or configuration database (such as those of FIG. 1), etc. Additionally or instead, the user interface module 414 may enable the user to fill out the needed information and/or to manually copy information from the recommendation or condition message into the work order initiation form.

After the user views and takes an action on a condition or recommendation message, via the user interface 416, the user interface module 414 reacts appropriately. In particular, if the user indicates that a work order is to be created, the user interface module 414 initiates the creation of a work order via the work order initiation module 410 with the information in the work order initiation form as specified or confirmed by the user via the user interface 416. Moreover, the user interface module 414 may store information about the creation of a work order in the work order status tracking module 420 (or may store an indication that no work order was created or that the condition or recommendation was declined by the user). The system may send this status information back through the input communication module 402 to the data analytic source that generated the recommendation or condition message, if desired. This status information may be especially important when the recommendation or status message comes from an external (e.g., expert) system, such as the remote system 330, because the expert at this system may have no other manner of knowing if the recommendation is being acted on in the plant. Having knowledge of whether a particular recommendation is acted on within the plant may be useful in generating new recommendations based on new data from the plant and to prevent making the same recommendation multiple times.

In another case, the system 300 may automatically generate one or more work orders based on the receipt of new condition or recommendation messages using the rules engine 404 and the rules database 406. In particular, in this case, the rules engine 404 receives data within a condition or recommendation message, analyzes the received data based on or using one or more of the logic rules in the rules database 406, and if one or more of the rules is met, generates one or more work orders via the work order initiation module 410. As noted above, the rules engine 404 may notify a user, via the user interface module 414 and the user interface 416 that a rule has resulted in the creation of a work order, and may enable the user to sign off on or confirm that the work order should be generated. When analysis of a rule specifies that a work order should be generated (with confirmation by the user if necessary), the rules engine 404 obtains the appropriate information from the condition or recommendation message and potentially from other sources, such as the asset translation database 430 or one of the in-plant systems of FIG. 1, and causes the work order initiation module 410 to create a work order initiation message, which is provided to business and work management system 338. The rules engine 404 or the work order initiation module 410 may then store the existence of a new work order in the work order status module 420.

After receiving a work order initiation message, the work order management system 338 then generates a work order and assigns that work order out to a particular maintenance person, who may be on-site staff in the normal course of business. The work order may eventually be accepted and completed and the person implementing the work order may interface with the business system 338 to indicate the status of the work order (e.g., accepted, rejected, completed, cancelled, in process, etc.). The business system 338 may then send this status information back to the system 300 (via the output communication interface 412, for example) and the work order status module 420 may update the status of that work order. Thereafter, or at various times, the work order status module 420 may provide a status indication of the work order via the input communication module 402 to the data analytic source (e.g., the remote expert system 330 of FIG. 2) to notify the person or system that made or sent the recommendation message of the existence of and status of a work order. In any of these examples, a status of a work order may be, for example, Pending (e.g., created but not act assigned or acted on), Active (assigned and being processed), and Inactive (either completed or cancelled). Of course, other status indications can be used instead or as well.

It will be understood that the work order initiation and tracking system described herein can be implemented as one or more computer applications, modules or programs, and can be executed in one or more computer processor devices within any desired process plant environment. While the applications, routines and modules described herein are preferably implemented in software stored in, for example, a server, a workstation, a handheld device or other computer, these routines may alternatively or additionally be implemented in hardware, firmware, application specific integrated circuits, programmable logic circuits, etc., as desired. If implemented in software, the routines or applications may be stored in any computer readable memory such as on a magnetic disk, a laser disk, an EPROM or EEPROM, solid state or other storage medium, in a RAM or ROM of a computer, handheld device, controller, field device, etc. Likewise, this software may be delivered to a user or a device via any known or desired delivery method including, for example, over a communication channel such as a telephone line, the Internet, on a transportable medium, such as a computer readable disk, etc.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The invention claimed is:

1. A maintenance system, for use with a process plant having a plurality of control devices that perform physical control functions within the process plant, comprising:
an asset management system comprising a first server configured to:
store, in a first computer memory that executes on a first computer processor, one or more asset diagnostic applications to monitor the real-time operation of the plurality of control devices during run-time in order to perform diagnostics on the control devices to create asset diagnostic data; and
generate one or more work orders specifying work to be performed on one or more of the plurality of control devices within the plant;
a work order assist system comprising a second server including:
a second computer memory; and
a second computer processor;
a first communication interface that is adapted to be coupled to and to communicate with the one or more asset diagnostic applications to receive the asset diagnostic data from the one or more asset diagnostic applications related to the plurality of control devices;
a second communication interface that is adapted to be coupled to and to communicate with the asset management system;
a work order assist module stored in the second computer memory that executes on the second computer processor to use the asset diagnostic data received from the one or more asset diagnostic applications via the first communication interface to determine work order information pertaining to the plurality of control devices and that communicates with the asset management system via the second communication interface to manage the one or more work orders created by the asset management system; and
a user interface module stored in the second computer memory that executes on the second computer processor to enable a user to generate a work order by:
a) importing the asset diagnostic data, and one or more of asset name data, asset tag data, or device identification data corresponding to respective control devices with which the asset diagnostic data is associated, from one or more of the asset diagnostic applications;
b) receiving user input including a work order initiation command, and one or more of asset name data, asset tag data, or device identification data corresponding to a particular control device with which the asset diagnostic data is associated;
c) storing the user input, the asset diagnostic data, and the one or more of asset name data, asset tag data, or device identification data corresponding to the particular control device with which the asset diagnostic data is associated in a plurality of network-based non-transitory storage devices having a collection of plant asset records stored thereon;
d) providing remote access to users over a computer network so the users can update the one or more of the asset name data, asset tag data, or device identification data corresponding to a particular control device in the collection of plant asset records in real time through a graphical user interface, wherein the one of the users provides the updated information in a non-standardized naming format dependent on the paradigm of the asset management system software used by the particular control device;
e) converting, by an asset translation database, the one or more of asset name data, asset tag data, or device identification data corresponding to the particular control device from the non-standardized naming format dependent on the paradigm of the asset management system software used by the particular control device into a common, standardized naming format for use in initiating the work order within the asset management system;
f) storing the common, standardized updated information about the particular control device in the collection of plant asset records in the common, standardized naming format;
g) automatically generating an asset condition message containing the updated information about the particular control device whenever updated information has been collected;
h) transmitting the asset condition message to the users over the computer network, so that the users have access to up-to-date information associated with the particular control device; and
i) initiating the work order for the particular control device via the asset management system, based on the asset condition message.

2. The maintenance system of claim 1, wherein the user interface module enables the user to review the asset diagnostic data from the one or more asset diagnostic applications regarding suggested actions to one or more of the plurality of control devices, and to initiate the generation of the one or more work orders via the asset management system, to implement the suggested actions to the one or more of the plurality of control devices.

3. The maintenance system of claim 2, wherein the user interface module enables the user to copy information from the asset diagnostic data received from the one or more asset diagnostic applications into the common, standardized naming format for use in initiating the work order within the asset management system.

4. The maintenance system of claim 1, wherein the user interface module provides one or more predetermined interface screens to the user via a user display to display an asset recommendation as made by different ones of the one or more asset diagnostic applications in the common, standardized naming format, and to enable the user to view asset information pertaining to the one or more control devices to which an asset recommendation applies in the common, standardized naming format.

5. The maintenance system of claim 1, wherein the user interface module provides one or more interface screens to the user via a user display to display an asset recommendation as made by one of the one or more asset diagnostic applications, and wherein the user interface module enables the user to accept or reject the asset recommendation and wherein, when the user accepts the asset recommendation, the work order assist module initiates the generation of the work order via the asset management system.

6. The maintenance system of claim 1, wherein the user interface module provides a work order initiation form to the user via a user display, and wherein the user interface module enables the user to generate the work order by importing data as provided in one or more messages from one or more of the asset diagnostic applications into the work order initiation form to be sent to the asset management system to generate a new work order.

7. The maintenance system of claim 1, wherein the work order assist system includes a work order database that receives information regarding work orders created by the asset management system via the second communication interface and wherein the user interface module enables the user to view information regarding one or more of the work orders as stored in the work order database.

8. The maintenance system of claim 7, wherein the work order database receives information regarding a status of the one or more work orders created by the asset management system and wherein the user interface module enables the user to view the status information regarding the one or more of the work orders created by the asset management system.

9. The maintenance system of claim 7, wherein the work order database receives and stores status information related to the status of the one or more work orders that have been previously generated by the asset management system, and wherein the work order assist module uses the status information to determine whether to initiate the generation of an additional work order.

10. The maintenance system of claim 7, wherein the work order assist module detects that the work order has been previously generated but not yet completed to correct a problem that is newly identified by one of the asset diagnostic applications, and alerts the user of the existence of the previously generated work order.

11. The maintenance system of claim 7, wherein the status information includes an indication of a current state of the one or more of the work orders created by the asset management system, the status information including one of if the work order has been sent to a maintenance worker, if the work order has been accepted by the maintenance worker, if the work order is complete, if the work order has been cancelled, and if the work order is in process.

12. The maintenance system of claim 7, wherein the user interface module enables the user to search the work order database for the one or more work orders related to a particular control device.

13. The maintenance system of claim 1, wherein the work order assist system includes a translation module stored in the second computer memory that executes on the second computer processor to translate the asset diagnostic data as provided by the one or more asset diagnostic applications into the common, standardized naming format usable by the asset management system.

14. The maintenance system of claim 13, wherein the translation module converts an asset name or tag for a control device as used in one of the asset diagnostic applications into an asset name or tag for the same control device as used in the asset management system.

15. The maintenance system of claim 1, wherein the work order assist system includes a rules database that stores one or more sets of rules used to process the asset diagnostic data from the asset diagnostic applications and a rules engine stored in the second computer memory that executes on the second computer processor to process the asset diagnostic data from the asset diagnostic applications using one or more of the sets of rules to generate information regarding the one or more work orders.

16. The maintenance system of claim 15, wherein the rules engine processes the asset diagnostic data from the asset diagnostic applications using one or more of the sets of rules to automatically generate the one or more work orders in the asset management system.

17. The maintenance system of claim 16, wherein the rules engine uses the sets of rules to detect one or more pre-determined conditions under which the work order is to be generated and automatically initiates the generation of the work order via the asset management system.

18. The maintenance system of claim 15, wherein the rules engine processes the asset diagnostic data from the asset diagnostic applications using one or more of the sets of rules to generate one or more proposed work orders in the asset management system and communicates with the user via the user interface module to indicate the one or more proposed work orders and to enable the user to initiate the creation of the one or more proposed work orders via the asset management system.

19. The maintenance system of claim 15, wherein the work order assist module uses the one or more of the sets of rules and the rules engine to process the asset diagnostic data from the asset diagnostic applications and to process device data related to the one or more of the plurality of control devices to generate information regarding the one or more work orders.

20. The maintenance system of claim 1, wherein one of the one or more asset diagnostic applications is located within the plant.

21. The maintenance system of claim 1, wherein one of the one or more asset diagnostic applications is located exterior to the plant and the first communication interface connects to the one of the one or more asset diagnostic applications via an exterior communication network.

22. A work order maintenance system, for use in a process plant having a plurality of control devices that perform physical control functions within the process plant, the work order maintenance system comprising:
  an asset management system comprising a first server configured to:
    store, in a first computer memory that executes on a first computer processor, one or more asset diagnostic applications to monitor the real-time operation of the plurality of control devices during run-time in order to perform diagnostics on the control devices to create asset diagnostic data; and
    generate one or more work orders specifying work to be performed on one or more of the plurality of control devices within the plant;
  a work order assist system comprising a second server including:
    a second computer memory; and
    a second computer processor;
    a first communication interface that is adapted to be coupled to and to communicate with the one or more asset diagnostic applications to receive the asset diagnostic data from the one or more asset diagnostic applications related to the plurality of control devices;
    a second communication interface that is adapted to be coupled to and to communicate with the asset management system;
    a user interface application stored in the second computer memory that executes on the second computer processor; and
    a work order assist module stored in the second computer memory that executes on the second computer processor to receive the asset diagnostic data received from the one or more asset diagnostic applications via the first communication interface and that communicates with the asset management system via the second communication interface to receive information related to the one or more work orders created by the asset management system and that provides work order information to a user via the user interface application related to the asset diagnostic data and to the one or more work orders; and
wherein the user interface application enables the user to generate a work order by:
a) importing the asset diagnostic data, and one or more of asset name data, asset tag data, or device identification data corresponding to respective control devices with which the asset diagnostic data is associated, from one or more of the asset diagnostic applications;
b) receiving user input including a work order initiation command, and one or more of asset name data, asset tag data, or device identification data corresponding to a particular control device with which the asset diagnostic data is associated;
c) storing the user input, the asset diagnostic data, and the one or more of asset name data, asset tag data, or device identification data corresponding to the particular control device with which the asset diagnostic data is associated in a plurality of network-based non-transitory storage devices having a collection of plant asset records stored thereon;
d) providing remote access to users over a computer network so the users can update the one or more of the asset name data, asset tag data, or device identification data corresponding to a particular control device in the collection of plant asset records in real time through a graphical user interface, wherein the one of the users provides the updated information in a non-standardized naming format dependent on the paradigm of the asset management system software used by the particular control device;
e) converting, by an asset translation database, the one or more of asset name data, asset tag data, or device identification data corresponding to the particular control device from the non-standardized naming format dependent on the paradigm of the asset management system software used by the particular control device into a common, standardized naming format for use in initiating the work order within the asset management system;
f) storing the common, standardized updated information about the particular control device in the collection of plant asset records in the common, standardized naming format;
g) automatically generating an asset condition message containing the updated information about the particular control device whenever updated information has been collected;
h) transmitting the asset condition message to the users over the computer network, so that the users have access to up-to-date information associated with the particular control device; and
i) initiating the work order for the particular control device via the asset management system, based on the asset condition message.

23. The maintenance system of claim 22, wherein the user interface application enables the user to review the asset diagnostic data from the one or more asset diagnostic applications regarding suggested actions to be made to one or more of the plurality of control devices, and to initiate the generation of the one or more work orders via the asset management system, to implement the suggested actions to the one or more of the plurality of control devices.

24. The maintenance system of claim 23, wherein the user interface application enables the user to copy information from the asset diagnostic data received from the one or more asset diagnostic applications into the common, standardized naming format for use in initiating the work order within the asset management system.

25. The maintenance system of claim 22, wherein the user interface application provides one or more predetermined interface screens to the user via a user display to display an asset action recommendation as made by different ones of the one or more asset diagnostic applications in a common, standardized naming format, and to enable the user to view asset information pertaining to the one or more control devices to which an asset action recommendation applies in the common, standardized naming format.

26. The maintenance system of claim 22, wherein the user interface application provides one or more interface screens to the user via a user display to display an asset action recommendation as made by one of the one or more asset diagnostic applications, and wherein the user interface application enables the user to accept or reject the asset action recommendation and wherein, when the user accepts the asset action recommendation, the work order assist module initiates the generation of the work order via the asset management system.

27. The maintenance system of claim 22, further including a work order database that receives information regarding work orders created by the asset management system via the second communication interface and wherein the user interface application enables the user to view information regarding one or more of the work orders stored in the work order database.

28. The maintenance system of claim 27, wherein the work order database receives information regarding a status of the one or more work orders created by the asset management system and wherein the user interface application enables the user to view the status information regarding one or more of the work orders created by the asset management system.

29. The maintenance system of claim 27, wherein the work order database receives and stores status information related to the status of the one or more work orders that have been previously generated by the asset management system, and wherein the work order assist module uses the status information to determine whether to initiate the generation of an additional work order in response to the receipt of an asset change recommendation from one of the one or more asset diagnostic applications.

30. The maintenance system of claim 27, wherein the user interface application enables the user to search the work order database for the one or more work orders related to a particular control device.

31. A work order generation system, for use with a process plant having a plurality of control devices that perform physical control functions within the process plant, the work order generation system comprising:
an asset management system comprising a first server configured to:
store, in a first computer memory that executes on a first computer processor, one or more asset diagnostic applications to monitor the real-time operation of the plurality of control devices during run-time in order to perform diagnostics on the control devices to create asset diagnostic data; and
generate one or more work orders specifying work to be performed on one or more of the plurality of control devices within the plant;

a work order assist system comprising a second server including:
  a second computer memory; and
  a second computer processor;
  a first communication interface that is adapted to be coupled to and to communicate with the one or more asset diagnostic applications to receive the asset diagnostic data from the one or more asset diagnostic applications related to the plurality of control devices;
  a second communication interface that is adapted to be coupled to and to communicate with the asset management system;
  a work order assist module stored in the second computer memory that executes on the second computer processor to process the asset diagnostic data received from the one or more asset diagnostic applications via the first communication interface to determine a need for the generation of the one or more work orders, and that communicates with the asset management system via the second communication interface to send information regarding the one or more work orders to be created by the asset management system; and
  a user interface module stored in the second computer memory that executes on the second computer processor to enable a user to generate a work order by:
    a) importing the asset diagnostic data, and one or more of asset name data, asset tag data, or device identification data corresponding to respective control devices with which the asset diagnostic data is associated, from one or more of the asset diagnostic applications;
    b) receiving user input including a work order initiation command, and one or more of asset name data, asset tag data, or device identification data corresponding to a particular control device with which the asset diagnostic data is associated;
    c) storing the user input, the asset diagnostic data, and the one or more of asset name data, asset tag data, or device identification data corresponding to the particular control device with which the asset diagnostic data is associated in a plurality of network-based non-transitory storage devices having a collection of plant asset records stored thereon;
    d) providing remote access to users over a computer network so the users can update the one or more of the asset name data, asset tag data, or device identification data corresponding to a particular control device in the collection of plant asset records in real time through a graphical user interface, wherein the one of the users provides the updated information in a non-standardized naming format dependent on the paradigm of the asset management system software used by the particular control device;
    e) converting, by an asset translation database, the one or more of asset name data, asset tag data, or device identification data corresponding to the particular control device from the non-standardized naming format dependent on the paradigm of the asset management system software used by the particular control device into a common, standardized naming format for use in initiating the work order within the asset management system;
    f) storing the common, standardized updated information about the particular control device in the collection of plant asset records in the common, standardized naming format;
    g) automatically generating an asset condition message containing the updated information about the particular control device whenever updated information has been collected;
    h) transmitting the asset condition message to the users over the computer network, so that the users have access to up-to-date information associated with the particular control device; and
    i) initiating the work order for the particular control device via the asset management system, based on the asset condition message.

32. The work order generation system of claim 31, wherein the work order assist module includes a rules database that stores one or more sets of rules used to process the asset diagnostic data from the asset diagnostic applications and a rules engine stored in the second computer memory that executes on the second computer processor to process the asset diagnostic data from the asset diagnostic applications using one or more of the sets of rules to generate work order information regarding the one or more work orders to be created by the asset management system.

33. The work order generation system of claim 32, wherein the rules engine processes the asset diagnostic data from the asset diagnostic applications using one or more of the sets of rules to automatically generate the one or more work orders in the asset management system.

34. The work order generation system of claim 32, wherein the rules engine uses the sets of rules to detect one or more pre-determined conditions under which the work order is to be generated and automatically initiates the generation of the work order via the asset management system.

35. The work order generation system of claim 32, further including a user interface, and wherein the rules engine processes the asset diagnostic data from the asset diagnostic applications using one or more of the sets of rules to generate one or more proposed work orders in the asset management system and communicates with the user via the user interface to indicate the one or more proposed work orders and to enable the user to initiate the creation of the one or more proposed work orders via the asset management system.

36. The work order generation system of claim 31, further including a second graphical user interface, and wherein the work order assist module provides the asset diagnostic data received from the one or more asset diagnostic applications to the user via the second graphical user interface and enables the user to create a work order initiation form to create the work order via the asset management system using the asset diagnostic data.

37. The work order generation system of claim 36, wherein the second graphical user interface enables the user to copy information from the asset diagnostic data received from the one or more asset diagnostic applications into the common, standardized naming format for use in initiating the work order within the asset management system.

38. A method of coordinating the operation of one or more asset diagnostic applications stored in a first computer memory that execute on a first computer processor, for use with monitoring real-time operation of a plurality of control devices that perform physical control functions within a plant during run-time in order to perform diagnostics on the control devices to create asset diagnostic data for an asset management system stored in a second computer memory that executes on a second computer processor, to generate one or more work orders specifying actions to be performed on one or more of the plurality of control devices within the plant, the method comprising:

communicating with the one or more asset diagnostic applications to receive the asset diagnostic data from the one or more asset diagnostic applications related to the plurality of control devices;

communicating with the asset management system to receive work order information from the asset management system;

processing the asset diagnostic data received from the one or more asset diagnostic applications to determine work order generation information pertaining to the plurality of control devices;

enabling, via a user interface module, a user to generate a work order by:
 a) importing the asset diagnostic data, and one or more of asset name data, asset tag data, or device identification data corresponding to respective control devices with which the asset diagnostic data is associated, from one or more of the asset diagnostic applications;
 b) receiving user input including a work order initiation command, and one or more of asset name data, asset tag data, or device identification data corresponding to a particular control device with which the asset diagnostic data is associated;
 c) storing the user input, the asset diagnostic data, and the one or more of asset name data, asset tag data, or device identification data corresponding to the particular control device with which the asset diagnostic data is associated in a plurality of network-based non-transitory storage devices having a collection of plant asset records stored thereon;
 d) providing remote access to users over a computer network so the users can update the one or more of the asset name data, asset tag data, or device identification data corresponding to a particular control device in the collection of plant asset records in real time through a graphical user interface, wherein the one of the users provides the updated information in a non-standardized naming format dependent on the paradigm of the asset management system software used by the particular control device;
 e) converting, by an asset translation database, the one or more of asset name data, asset tag data, or device identification data corresponding to the particular control device from the non-standardized naming format dependent on the paradigm of the asset management system software used by the particular control device into a common, standardized naming format for use in initiating the work order within the asset management system;
 f) storing the common, standardized updated information about the particular control device in the collection of plant asset records in the common, standardized naming format;
 g) automatically generating an asset condition message containing the updated information about the particular control device whenever updated information has been collected;
 h) transmitting the asset condition message to the users over the computer network, so that the users have access to up-to-date information associated with the particular control device; and
 i) initiating the work order for the particular control device via the asset management system, based on the asset condition message.

39. The method of claim 38, further including providing information to the user via a second graphical user interface to enable the user to review the asset diagnostic data from the one or more asset diagnostic applications regarding suggested actions to one or more of the plurality of control devices, and to initiate the generation of the one or more work orders via the asset management system, to implement the suggested actions to the one or more of the plurality of control devices.

40. The method of claim 39, further including enabling the user to copy information from the asset diagnostic data received from the one or more asset diagnostic applications into the common, standardized naming format for use in initiating the work order within the asset management system, via the second graphical user interface.

41. The method of claim 39, further including providing one or more predetermined interface screens to the user via a user display to display an asset action recommendation as made by different ones of the one or more asset diagnostic applications in a common, standardized naming format, and to enable the user to view asset information pertaining to the one or more control devices to which an asset action recommendation applies in the common, standardized naming format.

42. The method of claim 38, further including enabling the user to accept or reject an asset action recommendation and wherein, when the user accepts the asset action recommendation, initiating the generation of the work order via the asset management system.

43. The method of claim 38, further including receiving work order information regarding the one or more work orders created by the asset management system in a work order database, and enabling the user to view information regarding one or more of the work orders as stored in the work order database.

44. The method of claim 43, further including receiving information regarding a status of the one or more work orders created by the asset management system from the asset management system and enabling the user to view the status regarding the one or more of the work orders created by the asset management system.

45. The method of claim 44, further including using the status information to determine whether to initiate the generation of an additional work order via the asset management system.

46. The method of claim 43, further including enabling the user to search the work order database for the one or more work orders related to a particular control device.

47. The method of claim 38, further including storing a set of rules in a rules database and using the set of rules stored in the rules database to process the asset diagnostic data from the asset diagnostic applications to generate information regarding the creation of the one or more work orders.

48. The method of claim 47, further including using the set of rules stored in the rules database to process the asset diagnostic data from the asset diagnostic applications to automatically generate information regarding the creation of the one or more work orders.

49. The method of claim 47, further including generating one or more proposed work orders in the asset management system based on the one or more rules, communicating with the user via a second graphical user interface to indicate the one or more proposed work orders, and enabling the user via the user interface to initiate the creation of the one or more proposed work orders via the asset management system.

* * * * *